(12) United States Patent
Gong et al.

(10) Patent No.: US 10,841,774 B2
(45) Date of Patent: Nov. 17, 2020

(54) METHOD AND APPARATUS FOR FAST CHANNEL DEPLOYMENT AT AN INCIDENT SCENE

(71) Applicant: MOTOROLA SOLUTIONS, INC, Chicago, IL (US)

(72) Inventors: Ya-Hui Gong, Chengdu (CN); Da-Jun Chen, Chengdu (CN); Xun Fei, Chengdu (CN); Wen Feng, Chengdu (CN); Yi Tang, Chengdu (CN); Yong Tian, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/576,997

(22) PCT Filed: Jul. 10, 2015

(86) PCT No.: PCT/CN2015/083811
§ 371 (c)(1),
(2) Date: Nov. 27, 2017

(87) PCT Pub. No.: WO2017/008213
PCT Pub. Date: Jan. 19, 2017

(65) Prior Publication Data
US 2018/0167794 A1  Jun. 14, 2018

(51) Int. Cl.
*H04W 4/90* (2018.01)
*H04W 4/10* (2009.01)
(Continued)

(52) U.S. Cl.
CPC .............. *H04W 4/90* (2018.02); *H04W 4/08* (2013.01); *H04W 4/10* (2013.01); *H04W 24/10* (2013.01); *H04W 76/50* (2018.02); *H04W 88/04* (2013.01)

(58) Field of Classification Search
CPC ...... H04W 24/10; H04W 76/50; H04W 88/04
(Continued)

(56) References Cited

U.S. PATENT DOCUMENTS

| 7,034,678 B2 | 4/2006 | Burkley et al. |
| 7,983,841 B2 | 2/2011 | Goodman et al. |

(Continued)

FOREIGN PATENT DOCUMENTS

| CN | 101137119 A | 3/2008 |
| CN | 103517243 A | 1/2014 |
| WO | 2014035597 A2 | 3/2014 |

OTHER PUBLICATIONS

The International Search Report and the Written Opinion, corresponding Patent application No. PCT/CN2015/083811, filed Jul. 10, 2015, all pages.

*Primary Examiner* — Anthony S Addy
*Assistant Examiner* — Farid Seyedvosoghi (57) ABSTRACT

Fast channel deployment is achieved amongst subscriber devices (SDs) having an incident scene role at an incident scene. An SD detects an incident scene arrival trigger associated with arrival at an incident scene. Responsive to detecting the incident scene arrival trigger, the SD (i) tunes to a pre-configured incident channel or (ii) scans a plurality of channels for an incident channel and tunes to the incident channel once located. The SD receives, via the incident channel, an incident scene role to traffic channel mapping that maps a particular incident scene role associated with the subscriber device to a particular assigned traffic channel on which subscriber devices associated with a same incident scene role may communicate. The SD tunes to the particular assigned traffic channel as a function of the incident scene role to traffic channel mapping.

15 Claims, 5 Drawing Sheets

(51) Int. Cl.
*H04W 76/50* (2018.01)
*H04W 4/08* (2009.01)
*H04W 24/10* (2009.01)
*H04W 88/04* (2009.01)

(58) Field of Classification Search
USPC .................................................. 455/404.1
See application file for complete search history.

(56) References Cited

U.S. PATENT DOCUMENTS

| | | | |
|---|---|---|---|
| 8,195,215 B2 | 6/2012 | Marocchi et al. | |
| 8,280,364 B1 * | 10/2012 | Sennett | H04W 4/50 455/419 |
| 8,305,196 B2 | 11/2012 | Kennedy et al. | |
| 8,634,799 B1 * | 1/2014 | Economy | H04W 48/18 455/404.1 |
| 8,688,375 B2 | 4/2014 | Funk et al. | |
| 8,831,664 B2 | 9/2014 | Shaffer et al. | |
| 2005/0129240 A1 * | 6/2005 | Balfanz | H04L 63/20 380/270 |
| 2008/0144525 A1 | 6/2008 | Crockett et al. | |
| 2010/0203921 A1 | 8/2010 | Hans et al. | |
| 2013/0157558 A1 * | 6/2013 | Wiatrowski | H04M 3/42059 455/3.01 |

* cited by examiner

METHOD AND APPARATUS FOR FAST CHANNEL DEPLOYMENT AT AN INCIDENT SCENE

This application is a National Stage filing under 35 USC § 371 of co-pending Patent Cooperation Treaty international application having Serial No. PCT/CN2015/083811 (the 'PCT international application') filed on Jul. 10, 2015. This application claims priority to the PCT international application, the entire contents of which are incorporated herein by reference.

BACKGROUND OF THE INVENTION

Radio access networks (RANs) provide for radio communication links to be arranged within the network between a plurality of user terminals. Such user terminals may be mobile and may be known as 'mobile stations' or 'subscriber devices.' At least one other terminal, e.g. used in conjunction with subscriber devices, may be a fixed terminal, e.g. a base station, eNodeB, repeater, and/or access point. Such a RAN typically includes a system infrastructure which generally includes a network of various fixed terminals that are in direct radio communication with the subscriber devices. Each of the fixed terminals operating in the RAN may have one or more transceivers that may, for example, serve subscriber devices in a given region or area, known as a 'cell' or 'site', by radio frequency (RF) communication. The subscriber devices that are in direct communication with a particular fixed terminal are said to be served by the fixed terminal. In one example, all radio communications to and from each subscriber device within the RAN are made via respective serving fixed terminals. Sites of neighboring fixed terminals may be offset from one another and may be non-overlapping or partially or fully overlapping with one another. Additionally or alternatively, radio communications to and from each subscriber device may be made directly between those subscriber devices.

RANs may operate according to an industry standard land mobile radio (LMR) protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, or the Digital Mobile Radio (DMR) standard also defined by the ETSI. RANs may additionally or alternatively operate according to an industry standard broadband protocol such as, for example, the Long Term Evolution (LTE) protocol including multimedia broadcast multicast services (MBMS), the open mobile alliance (OMA) push to talk (PTT) over cellular (OMA-PoC) standard, the voice over IP (VoIP) standard, or the PTT over IP (PoIP) standard, among many other possibilities. Because the LMR systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) protocol. Subscriber devices in RANs such as those set forth above send and receive media streams (encoded portions of voice, audio, and/or audio/video streams) in a call in accordance with the designated protocol.

OMA-PoC, in particular, enables familiar PTT and "instant on" features of traditional half duplex subscriber devices, but uses mobile subscriber devices operating over modern broadband telecommunications networks. Using PoC, wireless subscriber devices such as mobile telephones and notebook computers can function as PTT half-duplex subscriber devices for transmitting and receiving. Other types of PTT models and multimedia call models (MMCMs) are also available.

Floor control in an OMA-PoC session is generally maintained by a PTT server that controls communications between two or more wireless subscriber devices. When a user of one of the subscriber devices keys a PTT button, a request for permission to speak in the OMA-PoC session is transmitted from the user's subscriber device to the PTT server using, for example, a real-time transport protocol (RTP) message. If no other users are currently speaking in the PoC session, an acceptance message is transmitted back to the user's subscriber device and the user can then speak into a microphone of the device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other subscriber devices in the group of subscriber devices or talk group to which the user is subscribed), using for example a unicast, point to multipoint, or broadcast communication technique.

Narrowband LMR systems, on the other hand, may operate in either a conventional or trunked configuration. In either configuration, a plurality of subscriber devices are partitioned into separate groups of subscriber devices. In a conventional system, each subscriber device in a group is selected to a particular frequency for communications associated with that subscriber device's group. Thus, each group is served by one channel, and multiple groups may share the same single frequency (in which case, in some embodiments, group IDs may be present in the group data to distinguish between groups using the same shared frequency).

In contrast, a trunked radio system and its subscriber devices use a pool of traffic channels for virtually an unlimited number of groups of subscriber devices (e.g., talkgroups). Thus, all groups are served by all channels. The trunked radio system works to take advantage of the probability that not all groups need a traffic channel for communication at the same time. When a member of a group requests a call on a control or rest channel on which all of the subscriber devices in the system idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the subscriber devices were idling to a traffic channel for the call, and instruct all subscriber devices that are not participating in the new call to move to a newly assigned control or rest channel selected from the pool of available channels. With a given number of channels, a much greater number of groups can be accommodated in a trunked system as compared with conventional radio systems.

Individual (e.g., one to one) or group (e.g., one to many) calls may be made between wireless and/or wireline participants in accordance with the narrowband or broadband protocol or standard. Group members for group calls may be statically or dynamically defined. That is, in a first example, a user or administrator working on behalf of the user may indicate to the switching and/or radio network (perhaps at a controller device, such as a call controller, PTT server, serving gateway, radio network controller (RNC), zone controller, or mobile management entity (MME), base station controller (BSC), mobile switching center (MSC), site controller, Push-to-Talk controller, or other network device) a list of participants of a group at the time of the call or in advance of the call. The group members (e.g., subscriber devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, subscriber devices may dynamically affiliate with a group (and also disassociate with the group) perhaps based on user input, and the switching and/or radio network may track group membership and route new group calls according to the current group membership.

One problem that has arisen at incident scenes in which many subscriber devices are arriving from various jurisdictions that use varying types of radio communications systems and protocols is that groups of firefighters, police, medical, and other first responders have difficulty communicating with other members of their same groups (from different jurisdictions) and communicating with other members of other groups at the incident scene in a fast and efficient manner. For example, a firefighter from one jurisdiction may arrive on-scene using a trunked subscriber device operable on a trunked radio system, a second firefighter from a second jurisdiction may arrive on-scene using a conventional subscriber device assigned to 'channel 1', and a third firefighter from a third jurisdiction may arrive on-scene using a conventional subscriber device assigned to 'channel 2,', e.g., a different channel than channel 1. Because each of the firefighters is idling on a different channel and the first firefighter is using a different type of radio system than the second and third firefighters, none of the firefighters can talk to one another (absent some backend bridging ability between the radio systems), and it is a very difficult and manual process to get two or more of the firefighters on a same channel so that they can coordinate their response at the incident scene. Because police, medical, and other groups are normally even further bifurcated from the firefighter group by design, these groups have an even harder time coordinating a response at the incident scene with the firefighter group, for example.

Accordingly, what is needed is an improved method and apparatus for fast channel deployment at an incident scene.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method and apparatus for fast channel deployment at an incident scene.

In one embodiment, a method for fast channel deployment at an incident scene includes: detecting, by a subscriber device, an incident scene arrival trigger associated with arrival at an incident scene; responsive to detecting the incident scene arrival trigger, one of (i) tuning, by the subscriber device, to a pre-configured incident channel and (ii) scanning, by the subscriber device, a plurality of channels for an incident channel and tuning to the incident channel once located; receiving, via the incident channel, an incident scene role to traffic channel mapping that maps a particular incident scene role associated with the subscriber device to a particular assigned traffic channel on which subscriber devices associated with a same incident scene role may communicate; and tuning, by the subscriber device, to the particular assigned traffic channel as a function of the incident scene role to traffic channel mapping.

In another embodiment, a subscriber device for fast channel deployment at an incident scene includes: one or more transceivers; one of a speaker and display; a data store; and one or more processors configured to: detect an incident scene arrival trigger associated with arrival at an incident scene; responsive to detecting the incident scene arrival trigger, one of (i) tune, via the one or more transceivers, to a pre-configured incident channel and (ii) scan, via the one or more transceivers, a plurality of channels for an incident channel and tune to the incident channel once located; receive, via the one or more transceivers, an incident scene role to traffic channel mapping that maps a particular incident scene role associated with the subscriber device to a particular assigned traffic channel on which subscriber devices associated with a same incident scene role may communicate; and tune, via the one or more transceivers, to the particular assigned traffic channel as a function of the incident scene role to traffic channel mapping.

In a still further embodiment, a method for fast channel deployment in a wireless network at an incident scene includes: maintaining, at an incident center computing device, an incident scene role to traffic channel mapping that maps a plurality of incident scene roles associated with subscriber devices to corresponding assigned traffic channels on which subscriber devices associated with a same incident scene role may communicate; periodically broadcasting, by the incident center computing device, the incident scene role to traffic channel mapping on an incident channel; wherein one of: (i) the incident channel is a preconfigured channel in the wireless network reserved for broadcasting of the incident scene role to traffic channel mapping and (ii) the incident center computing device broadcasts on the incident channel, prior to broadcasting the incident scene role to traffic channel mapping, one of a pre-configured synchronization code that identifies the incident channel, a pre-configured message identifier that identifies the incident channel, and a pre-configured op-code that identifies the incident channel.

Each of the above-mentioned embodiments will be discussed in more detail below, starting with example network and device architectures of the system in which the embodiments may be practiced, followed by an illustration of processing steps and message transmissions and/or receptions for achieving fast channel deployment at an incident scene from a subscriber device and from an incident center computing device perspective. Further advantages and features consistent with this disclosure will be set forth in the following detailed description, with reference to the figures.

1. NETWORK ARCHITECTURE AND DEVICE STRUCTURES

Figure 1:
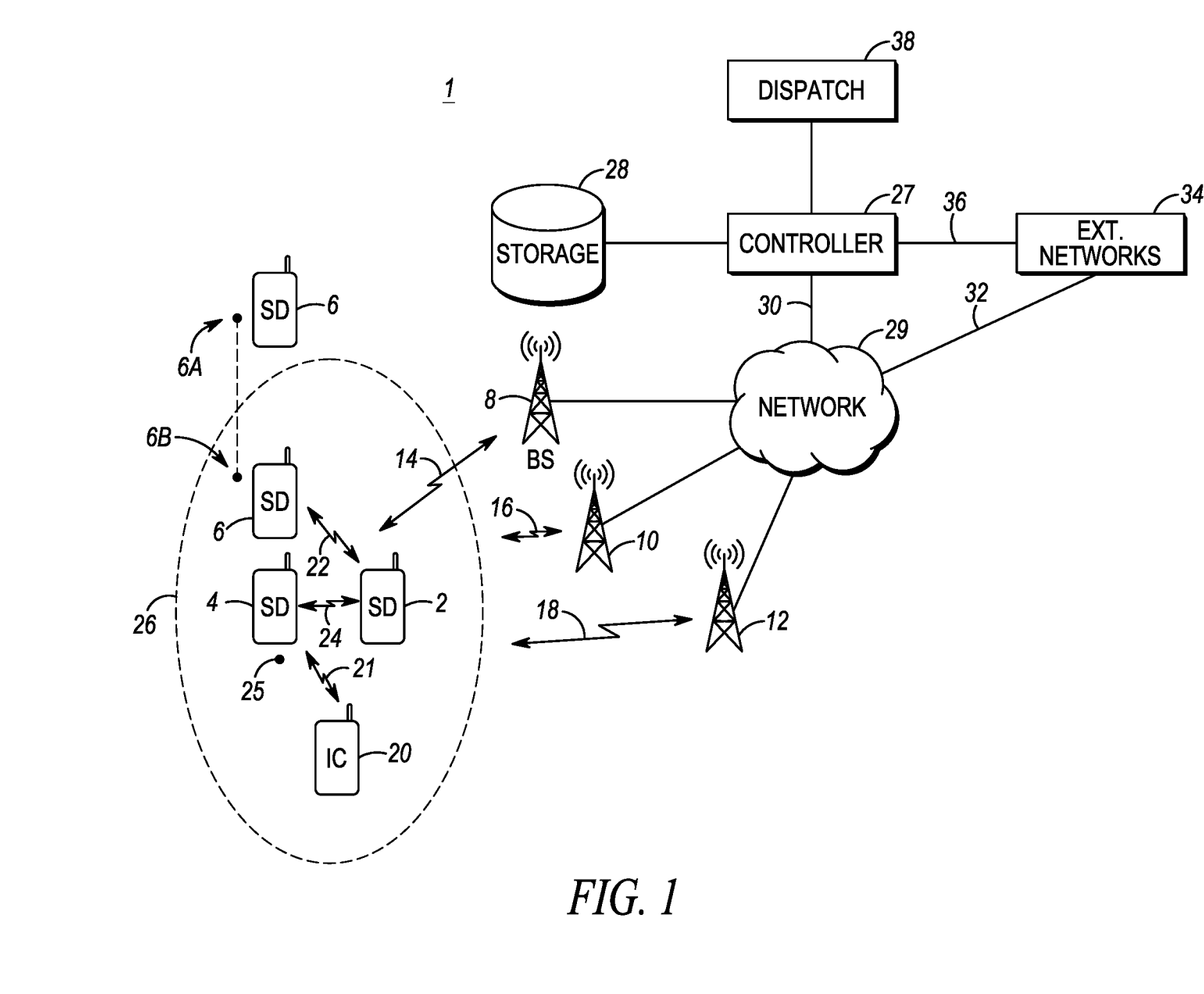
FIG. 1 is a block diagram of a communications network in accordance with some embodiments.

FIG. 1 illustrates a communications network 1 including client subscriber devices (e.g., SDs) 2, 4, 6, fixed terminals 8, 10, 12 (e.g. a repeater, base transceiver station (BTS) or eNodeB, hereinafter referred to as a base station (BS)), infrastructure wireless link(s) 14, 16, 18, incident center computing device 20, incident center wireless link 21, direct mode wireless links 22, 24, backhaul network 29, radio controller device 27, storage 28, communications connections 30, 32, 36, dispatch console 38, and external networks 34. Each BS 8, 10, 12 has at least two radio transmitters covering a radio coverage cell (not shown). One or several SDs 2, 4, 6 within radio coverage of a particular BS may connect to the particular BS using a corresponding wireless communication protocol via wireless link(s) 14, 16, 18. The SDs 2, 4, 6 may communicate with each other, and perhaps other devices accessible via other network links, using a group communications protocol over the wireless link(s) 14, 16, 18, or may communicate directly with one another via direct mode wireless link(s) 22, 24. The wireless link(s) 14, 16, 18 may each include one or both of an uplink channel and a downlink channel, and may include one or more physical channels or logical channels. Wireless link(s) 21, 22, 24 may each include a single direct mode channel or may include paired direct mode channels used for direct mode communications, and may include one or more physical channels or logical channels. Wireless link(s) 14, 16, 18 may implement, for example, a conventional or trunked land mobile radio (LMR) standard or protocol such as ETSI Digital Mobile Radio (DMR), Project 25 (P25) standard defined by the Association of Public Safety Communications Officials International (APCO), or other radio protocols or standards. In other embodiments, wireless link(s) 14, 16, 18 may implement a Long Term Evolution (LTE) protocol including multimedia broadcast multicast services (MBMS). Wireless link(s) 21, 22, 24 may implement, for example, a direct mode land mobile radio (LMR) standard or protocol such as ETSI DMR or direct mode P25 standard defined by the APCO, a direct mode LTE standard or protocol, or some other radio protocol or standard. In other embodiments, wireless link(s) 21, 22, 24 may implement an IEEE 802.11 standard or protocol or a Bluetooth standard or protocol. Other types of wireless protocols could be implemented as well.

In the example of FIG. 1, infrastructure wireless link(s) 14, 16, 18 may be established between SDs 2, 4, 6 and BSs 8, 10, 12, and direct mode wireless link(s) 22, 24 may be established between SDs 2, 4, 6, for transmission of a SD or other device-sourced call including a media stream (e.g., formatted bursts, packets, messages, frames, etc. containing digitized audio and/or video representing a portion of an entire call, among other possible signaling and/or other payload data) transmitted to one or more target devices, such as SDs 2, 4, 6, perhaps belonging to a same subscribed group of SDs as the source SD or device. The terms "media stream" and "media stream portion" are not intended to be limited to voice-only communications, but rather, to embody all possible digitized audio/visual payloads, including but not limited to, voice, audio, and/or audio/video or voice/video multiplexed streams. Wireless link 21 may be established between incident center computing device 20 and SDs 2, 4, 6 for direct mode transmission of control and signaling information such as incident scene roles, traffic channel assignments, and mapping information between incident scene roles and traffic channel assignments.

Wireless link(s) 14, 16, 18, 22, 24 may be half duplex or full duplex, and may include a unicast, multicast, or broadcast channel for transmitting a call from a source SD or other wireless device (not shown).

The uplink and downlink channels established over wireless link(s) 14, 16, 18 may be conventional channels permanently assigned to a group of SDs that include SDs 2, 4, 6, or may be a trunked traffic channel or MBMS channel temporarily assigned to the group of SDs for the purpose of conducting an assigned call. In addition, wireless link(s) 14, 16, 18 may include a separate control channel uplink and/or downlink for transmitting call request and call grant messages and/or for allocating trunked traffic channels for calls, among other functions. Other types of wireless links and communications system architectures are possible as well.

The SDs 2, 4, 6 may be configured with an identification reference (such as an International Mobile Subscriber Identity (IMSI) or MAC address) which may be connected to a physical media (such as a Subscriber Identity Module (SIM) card). Each SD 2, 4, 6 may be a group communications device, such as a push-to-talk (PTT) device, that is normally maintained in a monitor only mode, and which switches to a transmit-only mode (for half-duplex devices) or transmit and receive mode (for full-duplex devices) upon depression or activation of a PTT input switch. The group communications architecture in communications network 1 allows a single SD, such as a source SD (not shown), to communicate with one or more group members (such as SDs 2, 4, 6) associated with a particular group of SDs at the same time. In the example set forth in FIG. 1, SDs 2, 4, 6 (at location 6B) are assumed to be responding to an incident at incident scene 25 located within a defined incident scene area 26.

Although only three SDs, three BSs, three infrastructure wireless links, two direct mode wireless links are illustrated in FIG. 1, the present disclosure is not limited as such, and more or fewer SDs, BSs, and wireless links could be used in any particular implementation. Furthermore, while a single controller device 27 is illustrated in FIG. 1, more than one controller device 27 may be used and/or a distributed controller device 27 may be used that divides functions across multiple devices, perhaps for load balancing reasons. Finally, while storage 28 is illustrated as directly coupled to controller device 27, storage 28 may also be disposed remote from controller device 27 and accessible to controller device 27 via one or more of network 29 and/or external networks 34.

The BSs 8, 10, 12 may be linked to the controller device 27 via one or both of network 29 and communications connection 30. Network 29 may comprise one or more BSs, routers, switches, LANs, WLANs, WANs, access points, or other network infrastructure. For example, controller device 27 may be accessible to BS 8 via a dedicated wireline or via the Internet. In one example, BS 8 may be directly coupled to controller device 27 via one or more internal links under control of a single communications network provider. Network 29 may further include a call controller, PTT server, zone controller, evolved packet core (EPC), mobile management entity (MME), radio network controller (RNC), base station controller (BSC), mobile switching center (MSC), site controller, PTT controller, or other network device for controlling and distributing media streams amongst SDs via respective BSs. While in this example three BSs 8, 10, 12 are illustrated as being respectively associated with three corresponding wireless links 14, 16, 18, in other embodiments, a single BS may include corresponding hardware to support two or more wireless links, including the three wireless links 14, 16, and 18. In still further embodiments, no BSs may be available to SDs 2, 4, 6, in which case direct mode communication is the only mode of communication available to the SDs.

Controller device 27 may be a separate device in the infrastructure of the communications network 1 configured to control wireless link(s) 14, 16, 18 and, in normal operation and perhaps in the absence of an incident center computing device 20, channel assignment for servicing SDs 2, 4, 6 with infrastructure supported communications. In other embodiments, controller device 27 functionality may be coupled with or included in other devices in the network 29, in which case controller device 27 may be a zone controller, PTT server, or the like. In still further embodiments, controller device 27 functionality may be divided and provided directly in each of the BSs 8, 10, 12.

Storage 28 may function to store an incident scene role to traffic channel mapping that maps a particular incident scene role associated with SDs (e.g., such as police officer, fireman, medical response, traffic control, search and rescue, etc.) with a particular assigned traffic channel (conventional, trunked, direct mode, MBMS, etc.) on which all SDs at the incident scene of that particular incident scene role may communicate. The stored mapping may be modifiable by a dispatch console 38 and/or SD 2, 4, 6, and may be made available on request or periodically to the incident center computing device 20.

The one-to-many group communication structure may be implemented in communications network 1 in a number of ways and using any one or more messaging protocols, including multiple unicast transmissions (each addressed to a single group member SD), single multicast transmissions (addressed to a single group or multiple groups), single broadcast transmissions (the broadcast transmission perhaps including one or more group identifiers that can be decoded and matched by the receiving SDs), or any combination thereof.

External networks 34 may also be accessible to BSs 8, 10, 12 (and thus SDs 2, 4, 6) via network 29 and communications connection 32 and/or controller device 27 and communications connections 30, 36. External networks 34 may include, for example, a public switched telephone network (PSTN), the Internet, or another wireless service provider's network, among other possibilities.

Dispatch console 38 may be directly coupled to controller device 27 as shown, or may be indirectly coupled to controller device 27 via one or more of network 29 and external networks 34, or some other network device in network 29. The dispatch console 38 may provide an administrative or dispatch access to SDs 2, 4, 6 and controller device 27, and allow an administrator or dispatcher to initiate infrastructure-sourced group communications to groups of SDs 2, 4, 6, among other features and functions.

Figure 2:
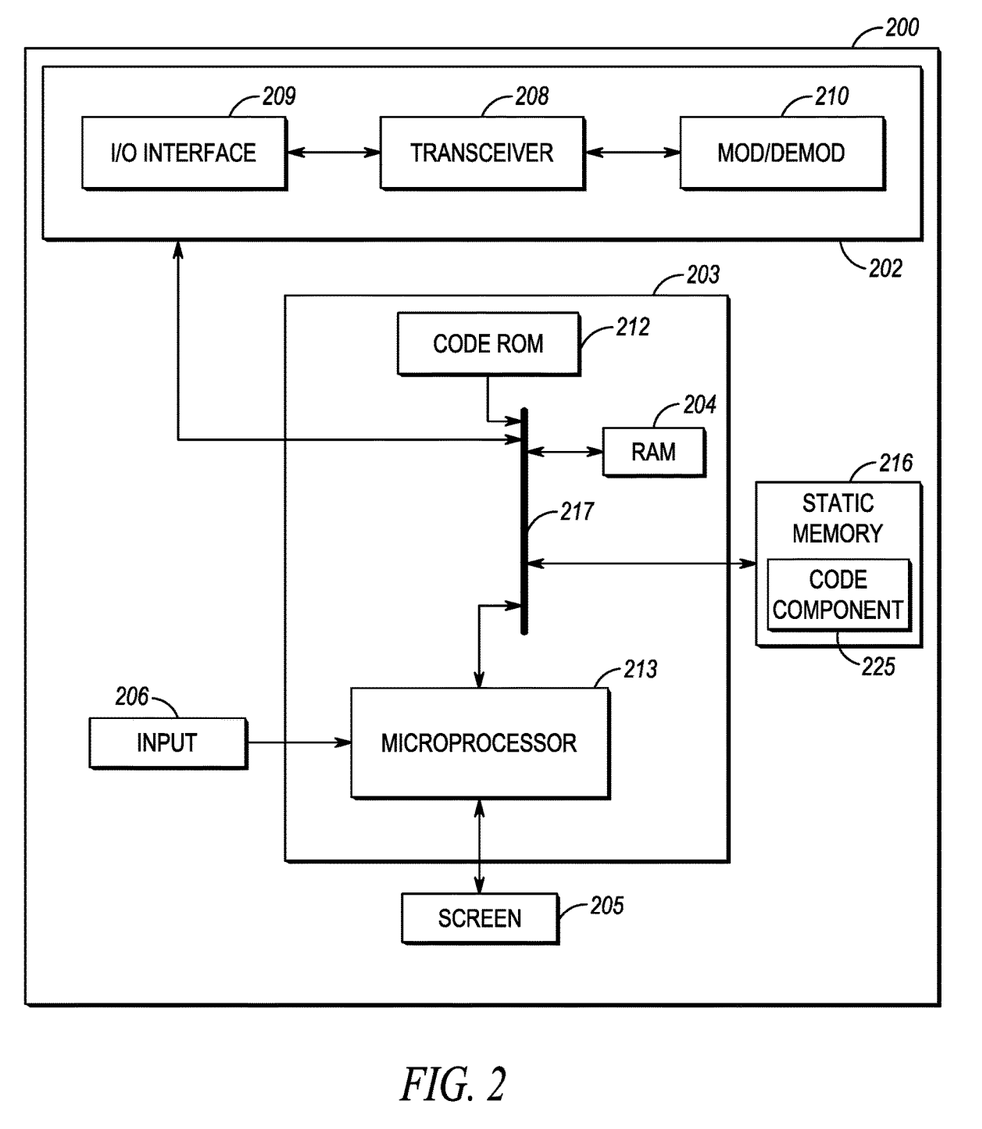
FIG. 2 is a block diagram of an incident center computing device in accordance with some embodiments.

Referring to FIG. 2, a schematic diagram illustrates an incident center computing device 200 according to some embodiments of the present disclosure. Incident center computing device 200 may be, for example, the same as or similar to the incident center computing device 20 of FIG. 1, and may take the form of a laptop, tablet, smart phone, two-way radio, or some other wireless-enabled portable computing device. As shown in FIG. 2, incident center computing device 200 includes a communications unit 202 coupled to a common data and address bus 217 of a processing unit 203. The incident center computing device 200 may also include an input unit (e.g., keypad, pointing device, etc.) 206 and a display screen 205, each coupled to be in communication with the processing unit 203.

The processing unit 203 may include a code Read Only Memory (ROM) 212 coupled to the common data and address bus 217 for storing data for initializing system components. The processing unit 203 may further include a microprocessor 213 coupled, by the common data and address bus 217, to a Random Access Memory (RAM) 204 and a static memory 216 (i.e., data store).

The communications unit 202 may include one or more wireless and/or wireline input/output (I/O) interfaces 209 that are configurable to communicate with SDs 2, 4, 6, and/or BSs 8, 10, 12. The communications unit 202 may include one or more antennas and one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless radio network. The communications unit 202 may additionally include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210.

The microprocessor 213 has ports for coupling to the input unit 206 and to the display screen 205. Static memory 216 may store operating code for the microprocessor 213 that, when executed, performs one or more of the processing, transmitting, and/or receiving steps set forth in FIG. 4 and accompanying text. Static memory 216 may also store, permanently or temporarily, information disclosed herein as being stored at storage 28, including but not limited to an incident scene role to traffic channel mapping that maps a particular incident scene role associated with SDs with a particular assigned traffic channel for all SDs at the incident scene of that incident scene role, among other information.

Static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

Figure 3:
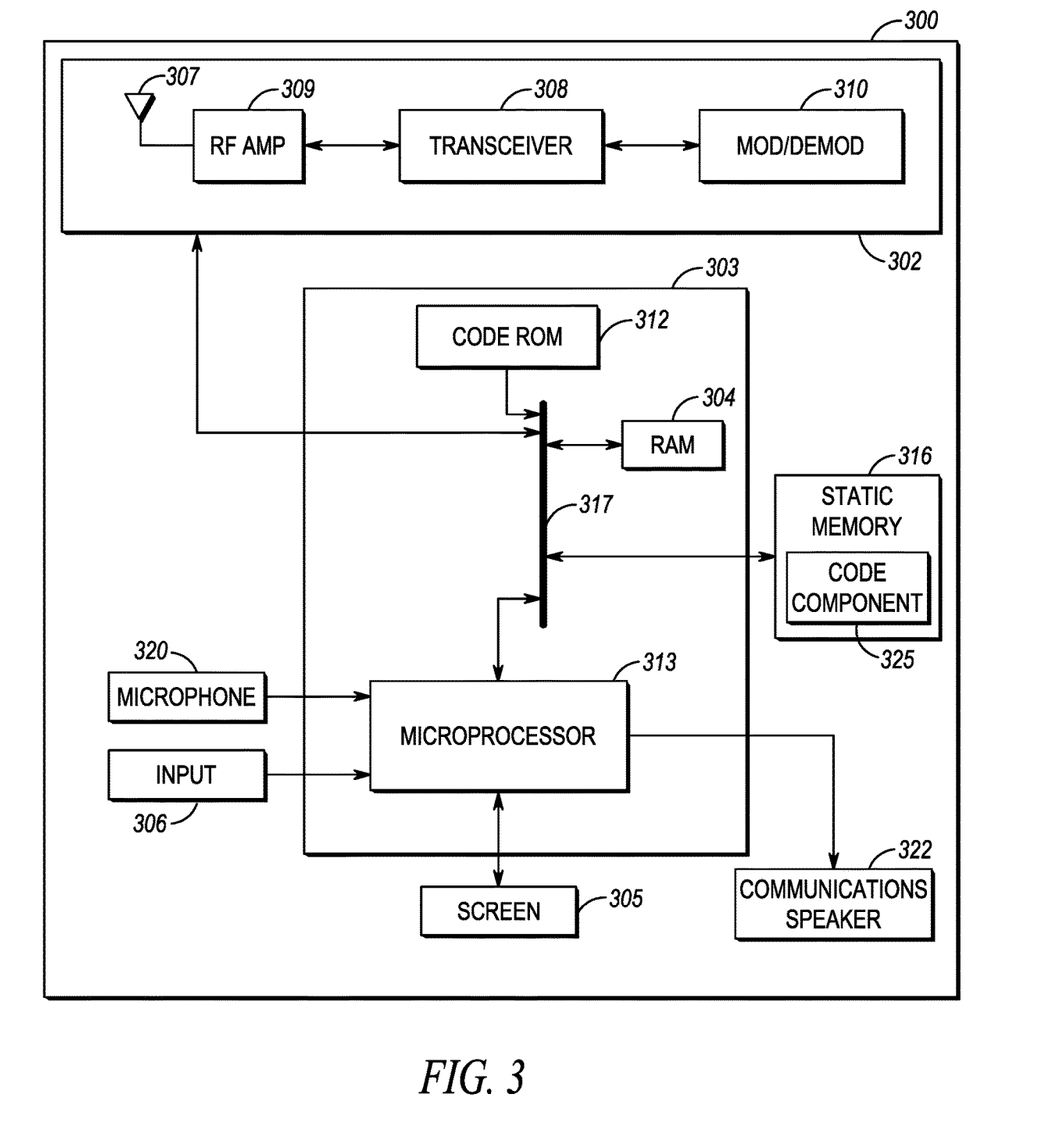
FIG. 3 is a block diagram of a subscriber device in accordance with some embodiments.

Referring to FIG. 3, a schematic diagram illustrates an SD 300 according to some embodiments of the present disclosure. SD 300 may be, for example, the same as or similar to the SDs 2, 4, 6 of FIG. 1. As shown in FIG. 3, SD 300 comprises a radio frequency communications unit 302 coupled to a common data and address bus 317 of a processing unit 303. The SD 300 may also include an input unit 306 and a display screen 305, each coupled to be in communication with processing unit 303. A microphone 320 captures audio from a user that is further vocoded by processing unit 303 and transmitted as voice stream data by communication unit 302 to other SDs and/or other devices in the network 29. A communications speaker 322 reproduces audio that is decoded from voice streams of voice calls received from other SDs and/or from an infrastructure device via the communications unit 302. Display screen 305 may reproduce image or video data decoded from media accompanying the voice stream received from other SDs and/or from the infrastructure via the communications unit 302.

The processing unit 303 may also include a code ROM 312 for storing data for initializing system components. The processing unit 303 may further include a microprocessor 313 coupled, by the common data and address bus 317, to a RAM 304 and a static memory 316 (i.e., data store).

The radio frequency communications unit 302 is a combined receiver (or receivers) and transmitter (or transmitters), e.g., transceiver(s) 308, having a common antenna 307. In some embodiments, additional separate or shared antennas may be provided for each one or more transmitter and/or receiver. The radio frequency communications unit 302 has the transceiver 308 coupled to the antenna 307 via a radio frequency amplifier 309. The transceiver(s) 308 may include a transceiver operating in accordance with one or more standard protocols, such as a DMR transceiver, a P25 transceiver, an LTE transceiver, a TETRA transceiver, an IEEE transceiver, and/or other type of wireless transceiver configurable to communicate via a wireless network. Other types of standards and protocols are possible as well. The transceiver 308 is also coupled to a combined modulator/demodulator 310.

The microprocessor 313 has ports for coupling to the input unit 306 and to the display screen 305. The microprocessor 313 further has ports for coupling to the microphone 320 and to the communications speaker 322, and/or other input and output devices. In some embodiments of the present disclosure, the static memory 316 may store operating code for the microprocessor 313 that, when executed by the microprocessor 313, perform one or more of the SD processing, transmitting, and/or receiving steps set forth in FIG. 3 and accompanying text. Static memory 316 may comprise, for example, a HDD, an optical disk drives such as a CD drive or DVD drive, a SSD, a tape drive, a flash memory drive, or a tape drive, to name a few.

2. PROCESSES FOR FAST CHANNEL DEPLOYMENT AT AN INCIDENT SCENE

Figure 4:
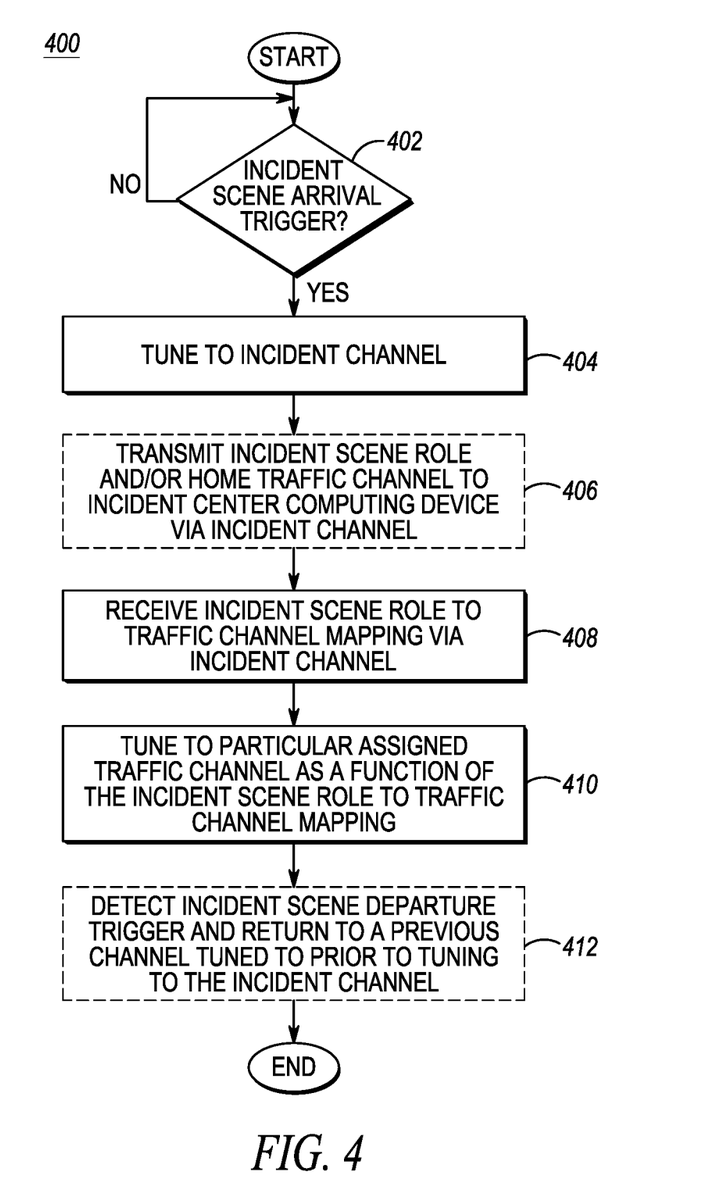
FIG. 4 is a flow diagram illustrating processes carried out by a subscriber device of FIGS. 1 and 3, in accordance with some embodiments.
Figure 5:
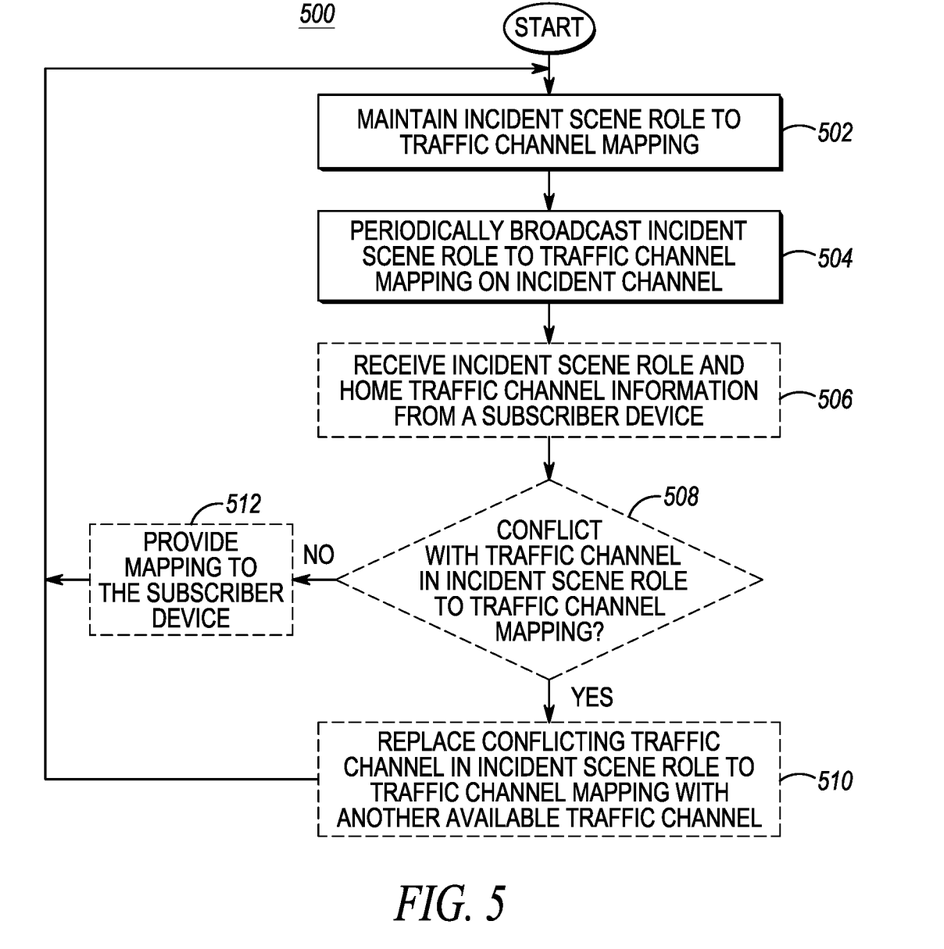
FIG. 5 is a flow timing diagram illustrating processes carried out by an incident center computing device of FIGS. 1 and 2, in accordance with some embodiments.

FIGS. 4 and 5 set forth respective flow diagrams illustrating example processes 400, 500 in a communications network, such as communications network 1 of FIG. 1, for fast channel deployment at an incident scene from an SD and from an incident center computing device perspective, respectively. Of course, additional steps, receptions, and/or transmissions not disclosed herein could be additionally added before, after, or in-between steps, receptions, and/or transmissions disclosed in FIGS. 4-5, and the presence of such additional steps, receptions, and/or transmissions would not negate the purpose and advantages of the examples set forth in detail throughout the remainder of this disclosure.

FIG. 4, in particular, illustrates an example process 400 in accordance with an embodiment for fast channel deployment at an incident scene from the perspective of an SD, such as SD 6 of FIG. 1 and/or SD 300 of FIG. 3. The process steps set forth in FIG. 4 will be described with respect to SD 6 of FIG. 1 as it moves from a location outside of an incident scene area 26 at location 6A to a current location within an incident scene area 26 at location 6B in responding to an incident scene 25. The same or similar steps may have already been executed by SDs 4 and/or 6.

Starting then at step 402 of FIG. 4, SD 6 determines if an incident scene arrival trigger has been detected associated with arrival at an incident scene 25 and/or within an incident scene area 26 surrounding the incident scene 25. An incident scene arrival trigger could be triggered in several ways. For example, the incident scene arrival trigger may be triggered as a result of an activation of a user input associated with arriving at an incident scene. More specifically, as the SD 6 moves from location 6A of FIG. 1 to a current location 6B and crosses into the incident scene area 26 associated with incident scene 25, a user of the SD 6 may activate an input (e.g., via input unit 306 of SD 300) that indicates that the user has entered and/or arrived at the incident scene 25. Additionally or alternatively, the incident scene arrival trigger may be triggered automatically as a result of SD 6 detecting its current location 6B (e.g., via a GPS receiver or triangulation process with three or more signal reference BSs) to be newly within a geo-fence defining the incident scene area 26 associated with incident scene 25. A geo-fence definition defining such a geo-fence may have been previously provided to the SD 6 via a user input unit 306 or via a wireless link 14, 16, 18 with one of BSs 8, 10, and 12, among other possibilities.

Furthermore, the incident scene arrival trigger may be triggered as a result of SD 6 automatically (e.g., based on a monitoring schedule) or manually (e.g., in response to a request to monitor) detecting an existence of a direct mode wireless link 21 associated with an incident center computing device 20 (e.g., hereinafter referred to as an "incident channel."). For example, the incident channel may be a pre-configured reserved channel in the communications network 1 in which the SD 6 operates, and the SD 6 may be configured to periodically or manually monitor for an existence of a signal or beacon over the incident channel indicating a presence of the incident center computing device 20 (i.e., transmitting the signal or beacon), and upon detecting such existence, cause the incident scene arrival trigger to be triggered. Detecting such existence may include the SD 6 monitoring the incident channel and receiving a pre-configured synchronization code associated with the incident channel and transmitted by the incident center computing device 20, the SD 6 monitoring the incident channel and receiving a pre-configured message identifier associated with the incident channel and transmitted by the incident center computing device 20, and the SD 6 monitoring the incident channel and receiving a pre-configured op-code associated with the incident channel and transmitted by the incident center computing device 20. Other variations are possible as well.

Still further, the incident scene arrival trigger may be triggered as a result of SD 6 automatically (e.g., based on a monitoring schedule) or manually (e.g., in response to a request to monitor) scanning a plurality of channels in the communications network 1 and detecting an incident channel (which is not a pre-configured reserved channel in the communications network 1). For example, the SD 6 may be configured to periodically or manually scan the plurality of channels for an existence of a signal or beacon indicating an incident channel and a presence of the incident center computing device 20 (i.e., transmitting the signal or beacon including a synchronization code, message identification, or op-code as set forth above), and upon detecting such existence, cause the incident scene arrival trigger to be triggered. Other possibilities exist as well.

Once an incident scene arrival trigger is detected at step 402, the SD 6 tunes its receiver to the incident channel at step 404 (e.g., the pre-configured or scanned and located incident channel from step 402).

At step 406, the SD 6 may optionally transmit its incident scene role and/or home traffic channel to the incident center computing device 20 via the incident channel (e.g., an uplink portion of a paired uplink/downlink incident channel, the uplink and downlink being separated by time, frequency, and/or sub-carrier, among other possibilities). For example, the SD 6 may transmit an identifier identifying the particular incident scene role associated with the SD 6 to the incident center computing device 20 via the incident channel. The identifier may be an indexed identifier, such as "1" for firefighter, "2" for police, "3" for medical, "4" for traffic control, etc., or may be a text string identifying the role itself, such as "firefighter," among other possibilities. The incident center computing device 20 may use the provided particular incident scene role to limit the number and types of incident scene role to traffic channel mappings provided to the SD 6 in response, among other possibilities. The SD 6 may additionally or alternatively transmit an indication of a home traffic channel that the SD 6 is configured to use to communicate in a home jurisdiction of the SD 6, perhaps based as well on the indicated incident scene role. For example, SD 6 may be configured to use "channel 2" or a "yellow channel" for firefighting communications in a home jurisdiction outside of communications network 1 (e.g., at location 6A in FIG. 1), and may transmit an indication of the home traffic channel to the incident center computing device 20 for interference minimization purposes. More specifically, because SD 6 is configured to use a particular home traffic channel for communications upon arrival at incident scene 25 and incident scene area 26 (until assigned otherwise by incident center computing device 20), the incident center computing device 20 may desire to avoid assigning any roles to the equivalent traffic channel in communications network 1 (e.g., "channel 2" or "yellow channel") in the mapping it maintains. Or, if the incident center computing device 20 has already assigned the equivalent traffic channel in communications network 1 to a particular incident scene role, the incident center computing device 20 may wish to assign some other available communications network 1 traffic channel in the equivalent traffic channel's place.

At step 408, the SD 6 receives an incident scene role to traffic channel mapping from the incident center computing device 20 via the incident channel. The SD 6 then processes the mapping and identifies an assigned traffic channel as a function of its configured incident scene role. The incident scene role of SD 6 may have been pre-configured at SD 6 in a provisioning process prior to arrival at incident scene 25 or incident scene area 26, may have been entered via a user interface such as input unit 306 of the SD 6, may have been set via an over-the-air update from one of BSs 8, 10, 12 and wireless links 14, 16, 18 (or via its home traffic channel in its home jurisdiction), or set via some other process. In the event that the SD 6 provided its incident scene role to the incident center computing device at step 406, the incident scene role to traffic channel mapping received at step 408 may include a single mapping that takes the form set forth in Table I.

TABLE I

| Incident Scene Role | Traffic Channel |
|---|---|
| firefighter | A |

As set forth in Table I, the SD 6 receives a mapping setting forth its incident scene role ("firefighter") and its assigned Traffic Channel ("A") on which SDs associated with the same incident scene role (firefighter) may communicate with one another within the incident scene area 26 surrounding the incident scene 25. The traffic channel defined in the mapping may be an index associated with particular channel parameters stored in the SD, or may set forth those particular channel parameters themselves. For example, Channel "A" may be pre-configured at SD 6 to identify a direct mode channel at a particular frequency and/or using a particular time slot or sub-carrier. In other embodiments, the mapping may explicitly set forth the particular frequency and/or time slot or sub-carrier. In other embodiments, Channel "A" may be a conventional (repeated) LMR radio channel, a trunked LMR radio channel or an MBMS LTE channel (perhaps assigned or otherwise reserved by communications network 1 at the incident center computing device's 20 request), a direct mode LMR channel, or a direct mode LTE channel. Other possibilities exist as well.

In other embodiments, including those in which the SD 6 does not provide its incident scene role to the incident center computing device 20 at step 406, the incident scene role to traffic channel mapping received at step 408 may include a plurality of mappings that takes the form set forth in Table II.

TABLE II

| Incident Scene Role | Traffic Channel |
|---|---|
| firefighter | A |
| police | B |
| medical | C |
| traffic | D |

As set forth in Table II, the SD 6 receives a mapping setting forth multiple different incident scene roles and each role's assigned traffic channel (which may be the same or different, but at least in one embodiment are all different) on which SDs associated with the same incident scene role may communicate with one another within the incident scene area 26 surrounding the incident scene 25. Traffic channels set forth in Table II may be the same or similar to those described above with respect to Table I. In this case, the SD 6 parses the received mapping, locates the incident scene role identically matching or most closely matching its assigned particular incident scene role, and identifies the corresponding assigned traffic channel for that role. One advantage of receiving the entire mapping is that the SD 6 can provide the mapping to its user via a display such as display screen 305, and allow its user to also contact other SDs having other incident scene roles at the incident scene to coordinate responses or obtain specific aid or information by providing some or all of a content of the incident scene role to traffic channel mapping to the user via a user-interface of the SD 6 and allowing the user to select the incident scene role (and thus the assigned traffic channel) needed by the user.

At step 410, the SD 6 tunes to the particular assigned traffic channel as a function of its incident scene role and the incident scene role to traffic channel mapping received at step 408. The SD 6 may then receive media over the assigned traffic channel from other SDs (and in some embodiments dispatch consoles in the event the traffic channel is an infrastructure channel) having a same role or associated role and plays back the media via a display screen 305 or communications speaker 322 of the SD 6. Similarly, the SD 6 may then transmit media over the assigned traffic channel to other SDs having a same role or an associated role (and in some embodiments dispatch consoles in the event the traffic channel is an infrastructure channel) captured via an input microphone 320 and/or video camera integrated or coupled to the SD 6.

At optional step 412, the SD 6 detects an incident scene departure trigger associated with a departure from the incident scene area 26 associated with incident scene 25. The incident scene departure trigger may be triggered as a result of an activation of a user input associated with departing from an incident scene. More specifically, as the SD 6 moves from location 6B of FIG. 1 to current location 6A and crosses out of the incident scene area 26 associated with incident scene 25, a user of the SD 6 may activate an input (e.g., via input unit 306 of SD 300) that indicates that the user has departed the incident scene 25.

Additionally or alternatively, the incident scene departure trigger may be triggered automatically as a result of SD 6 detecting its current location 6A (e.g., via a GPS receiver or triangulation process with three or more signal reference BSs) to be newly outside of the geo-fence defining the incident scene area 26 associated with incident scene 25.

Furthermore, the incident scene departure trigger may be triggered as a result of SD 6 failing to detect the incident channel. For example, failing to detect the incident channel may include failing to detect, for at least a threshold period of time (e.g., such as 1, 5, 10, or 60 seconds), a pre-configured synchronization code, message identifier, or opcode associated with the incident channel. Other variations are possible as well.

Once an incident scene departure trigger is detected at step 412, the SD 6 tunes its receiver back to a previous channel tuned to prior to tuning to the particular assigned traffic channel at step 410 and prior to tuning to the incident channel at step 404. The previous channel may be, for example, a home jurisdiction home traffic channel. Other possibilities exist as well.

FIG. 5 illustrates an example process 500 in accordance with an embodiment for fast channel deployment at an incident scene from the perspective of an incident center computing device, such as incident center computing device 20 of FIG. 1 and/or incident center computing device 200 of FIG. 2. The process steps set forth in FIG. 5 will be described with respect to incident center computing device 20 of FIG. 1 as SD 6 moves from a location outside of an incident scene area 26 at location 6A to a current location within an incident scene area 26 at location 6B.

Starting then at step 502 of FIG. 5, the incident center computing device 20 maintains an incident scene role to traffic channel mapping that may be the same or similar to that set forth in Tables I or II above. The mapping stored and maintained at the incident center computing device 20 may be originally created at the incident center computing device 20 via an input unit 206 interface of the device, may be provisioned at the incident center computing device 20 via I/O interface 209 locally or via an infrastructure wireless link, or created in some other manner. Modifications and/or additions to the mapping maintained at the incident center computing device 20 may be similarly provided.

At step 504, the incident scene role to traffic channel mapping is periodically or intermittently broadcast or transmitted on an incident channel. As set forth above, the incident channel is a channel on a direct mode wireless link associated with an incident center computing device. In one embodiment, the incident channel may be a preconfigured reserved channel in the wireless network reserved for broadcasting of the incident scene role to traffic channel mapping. In another embodiment, the incident center computing device may select any available channel as an incident channel, and subsequently identify the available channel as an incident channel by continuously, periodically, or intermittently broadcasting on the selected incident channel, prior to broadcasting the incident scene role to traffic channel mapping, one of a pre-configured synchronization code that identifies the incident channel, a pre-configured message identifier that identifies the incident channel, and a pre-configured op-code that identifies the incident channel, among other possibilities.

The incident center computing device may transmit the synchronization code, message identifier, and/or op-code more frequently than the actual incident scene role to traffic channel mapping in order to aid SDs in locating the incident channel.

The incident channel may be a conventional LMR radio channel, a trunked LMR radio channel, an MBMS LTE channel, a direct mode LMR channel, a direct mode LTE channel, an IEEE 802.11 channel, a BT channel, or some other similar channel. The type of channels (e.g., protocol and/or standard) identified in the incident scene role to traffic channel mapping may be the same or different from the type of channel of the incident channel. For example, the incident channel may be a direct mode LMR channel and the traffic channels identified in the mapping may also be direct mode LMR channels. In another example, the incident channel may be an IEEE 802.11 or BT channel and the traffic channels in the mapping may be LMR or LTE channels. Other variations and combinations of types of channels are possible as well.

At optional step 506, the incident center computing device 20 receives an incident scene role and home traffic channel from a particular SD, including perhaps the same incident scene role and home traffic channel described with respect to step 406 of FIG. 4 are transmitted by SD 6 of FIG. 1. The incident center computing device 20 may receive this information as, for example, SD 6 moves from location 6A outside of incident scene area 26 to a current location 6B within incident scene area 26 to respond at incident scene 25. After detecting the incident channel at step 504, the SD 6 may transmit such information to the incident center computing device 20.

At optional step 508, the incident center computing device 20 determines if there is a conflict between the SD's indicated home traffic channel and an equivalent traffic channel (e.g., the same traffic channel or a channel having same or overlapping parameters in communications network 1, such as the same or overlapping frequency range, time slot, sub-carrier, etc.) already included in the incident scene role to traffic channel mapping. For example, if the SD 6 uses channel 3 as a home channel for firefighting communications when in its home jurisdiction, and the communications network 1 has assigned channel 3 already in the incident scene role to traffic channel mapping (for firefighting or some other role), there would be a conflict. If there is a conflict, processing moves to optional step 510 where the incident center computing device 20, in order to avoid interference with other SDs using the same home traffic channel, may substitute or otherwise replace the equivalent traffic channel in the mapping for another available traffic channel in the communications network 1. In addition, the incident center computing device 20 may broadcast an updated mapping reflecting the substitution so that SDs that were already on the equivalent but conflicting traffic channel may receive the updated mapping and move to the substituted traffic channel.

Returning to step 508, if instead the incident center computing device 20 determines that there is no conflict with a traffic channel in the mapping, processing proceeds to optional step 512, where the incident center computing device 20 may provide a full mapping via broadcast or reduced mapping (e.g., with only the incident scene role to traffic channel for the particular incident scene role provided at step 506) via unicast to the SD. In other examples, the incident center computing device 20 may simply wait for a next periodic broadcast of the updated mapping at step 504 instead of broadcasting or unicast transmitting the updated mapping at step 512.

3. CONCLUSION

In accordance with the foregoing, an improved method and apparatus for fast channel deployment at an incident scene is disclosed. As a result of the foregoing, incident scene channel assignments and first responder communications can be quickly and efficiently handled at an incident scene by an incident center computing device, allowing for critical communications between in-jurisdiction (e.g., those normally operating within communications network 1) and out-of-jurisdiction SDs (e.g., those normally not operating within communications network 1) to be divided amongst available traffic channels within communications network 1, with or without the aid of an infrastructure back-end network, and without requiring SD users to manually coordinate channel re-assignments amongst themselves. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for fast channel deployment at an incident scene, the method comprising:
   detecting, by a subscriber device configured to have a particular incident scene role, an incident scene arrival trigger associated with arrival at an incident scene;
   responsive to detecting the incident scene arrival trigger:
   one of (i) tuning, by the subscriber device, to a pre-configured incident channel and (ii) scanning, by the subscriber device, a plurality of channels for an incident channel and tuning to the incident channel once located;
   transmitting an identifier identifying the particular incident scene role configured at the subscriber device to an incident center computing device via the incident channel, the subscriber device transmitting to an incident center computing device via the incident channel an indication of a home traffic channel that the subscriber device is configured to use to communicate in a home jurisdiction of the subscriber device in order to provide the incident center computing device with an indication of channels to avoid in the incident scene role to traffic channel mapping for interference avoidance purposes;
   receiving, via the incident channel, an incident scene role to traffic channel mapping that maps one or more incident scene roles to one or more assigned traffic channels on which subscriber devices associated with a same incident scene role may communicate, wherein the incident scene role to traffic channel mapping sets forth only the particular incident scene role and a particular one of the assigned traffic channels; and
   tuning, by the subscriber device, to the particular one of the assigned traffic channels set forth in the incident scene role to traffic channel mapping for its configured particular incident scene role.

2. The method of claim 1, further comprising providing some or all of a content of the incident scene role to traffic channel mapping to a user via a user-interface so as to allow the user to tune away from the particular one of the assigned traffic channels set forth in the incident scene role to traffic channel mapping for its configured particular incident scene role to communicate with one or more selected incident scene roles at the incident scene different from the particular incident scene role configured at the subscriber device.

3. The method of claim 1, wherein the incident channel is a reserved channel pre-configured in the subscriber device.

4. The method of claim 1, wherein the subscriber device scans the plurality of channels for the incident channel, and wherein scanning for the incident channel comprises one of: finding a pre-configured synchronization code associated with the incident channel during the channel scan, finding a pre-configured message identifier associated with the incident channel during the channel scan, and finding a pre-configured op-code associated with the incident channel during the channel scan.

5. The method of claim 1, wherein the incident channel is a paired channel including an uplink portion and a downlink portion, and each of the uplink portion and the downlink portion is one of a time slot of a multi-slot time division multiple access (TDMA) radio channel, a frequency division multiple access (FDMA) radio channel, and an orthogonal frequency division multiplexing access (OFDMA) radio channel.

6. The method of claim 1, wherein the particular one of the assigned traffic channels is one of a conventional land mobile radio (LMR) radio channel, a trunked LMR radio channel, a multimedia broadcast multicast services (MBMS) long term evolution (LTE) channel, a direct mode LMR channel, and a direct mode LTE channel.

7. The method of claim 1, wherein detecting the incident scene arrival trigger comprises detecting activation of a user input associated with arriving at the incident scene.

8. The method of claim 1, wherein detecting the incident scene arrival trigger comprises retrieving a current location of the subscriber device and detecting, as a function of the current location, entrance into a geo-fence associated with the incident scene.

9. The method of claim 1, wherein the particular one of the assigned traffic channels is different from the home traffic channel.

10. The method of claim 1, further comprising detecting, by a subscriber device, an incident scene departure trigger associated with a departure from the incident scene, and responsively returning to a previous channel tuned to prior to tuning to the particular one of the assigned traffic channels.

11. The method of claim 10, wherein detecting the incident scene departure trigger comprises failing to detect a periodic broadcast on the incident channel for a threshold period of time.

12. The method of claim 1, further comprising receiving group media communications associated with the particular incident scene role via the particular one of the assigned traffic channels and playing back, by the subscriber device, the group media communications.

13. A subscriber device for fast channel deployment at an incident scene, the subscriber device comprising:
   one or more transceivers;
   one of a speaker and display;
   a data store; and
   one or more processors configured to:
   detect an incident scene arrival trigger associated with arrival of the subscriber device, configured to have a particular incident scene role, at an incident scene, the particular incident scene role having been entered via a user interface upon arrival at the incident scene;
   responsive to detecting the incident scene arrival trigger:
   one of (i) tune, via the one or more transceivers, to a pre-configured incident channel and (ii) scan, via the one or more transceivers, a plurality of channels for an incident channel and tune to the incident channel once located;
   transmitting an identifier identifying the particular incident scene role configured at the subscriber device to an incident center computing device via the incident channel, the subscriber device transmitting to an incident center computing device via the incident channel an indication of a home traffic channel that the subscriber device is configured to use to communicate in a home jurisdiction of the subscriber device in order to provide the incident center computing device with an indication of channels to avoid in the incident scene role to traffic channel mapping for interference avoidance purposes;
   receive, via the one or more transceivers, an incident scene role to traffic channel mapping that maps one or more incident scene roles to one or more assigned traffic channels on which subscriber devices associated with a same incident scene role may communicate, wherein the incident scene role to traffic channel mapping sets forth only the particular incident scene role and a particular one of the assigned traffic channels; and tune, via the one or more transceivers, to the particular one of the assigned traffic channels set forth in the incident scene role to traffic channel mapping for its configured particular incident scene role.

14. The subscriber device of claim 13, wherein the incident channel is a reserved channel pre-configured in the subscriber device.

15. A method for fast channel deployment in a wireless network at an incident scene, the method comprising:

maintaining, at an incident center computing device, an incident scene role to traffic channel mapping that maps a plurality of incident scene roles associated with subscriber devices to corresponding assigned traffic channels on which subscriber devices associated with a same incident scene role may communicate;

periodically broadcasting, by the incident center computing device, the incident scene role to traffic channel mapping on an incident channel, wherein one of: (i) the incident channel is a preconfigured channel in the wireless network reserved for broadcasting of the incident scene role to traffic channel mapping and (ii) the incident center computing device broadcasts on the incident channel, prior to broadcasting the incident scene role to traffic channel mapping, one of a pre-configured synchronization code that identifies the incident channel, a pre-configured message identifier that identifies the incident channel, and a pre-configured op-code that identifies the incident channel;

receiving, at the incident center computing device from a subscriber device in the wireless network, an identifier identifying a particular incident scene role associated with the subscriber device and receiving, from the subscriber device, an indication of a home traffic channel that the subscriber device is configured to use to communicate in a home jurisdiction of the subscriber device; and determining, by the incident center computing device, that a particular traffic channel at the incident scene equivalent to the home traffic channel is included in the incident scene role to traffic channel mapping, and responsively replacing the particular traffic channel in the incident scene role to traffic channel mapping with another available channel in the wireless network.

* * * * *